R. H. GILBERT.
REAR AXLE CONSTRUCTION.
APPLICATION FILED FEB. 19, 1907.
962,633.
Patented June 28, 1910.
2 SHEETS—SHEET 1.
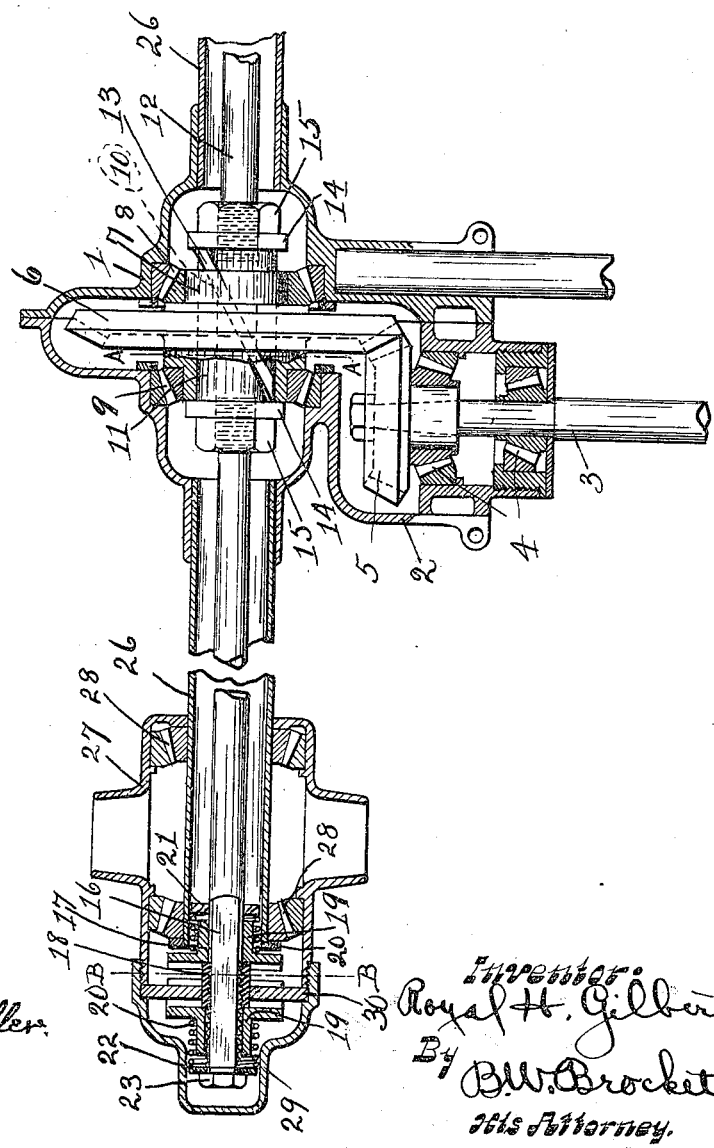

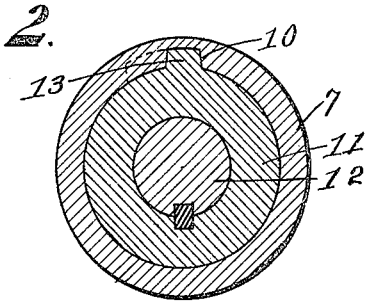
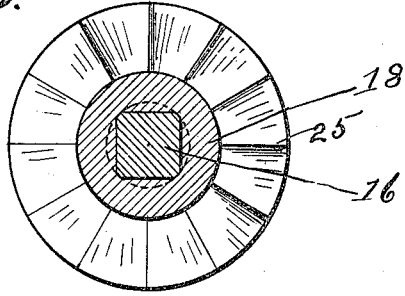
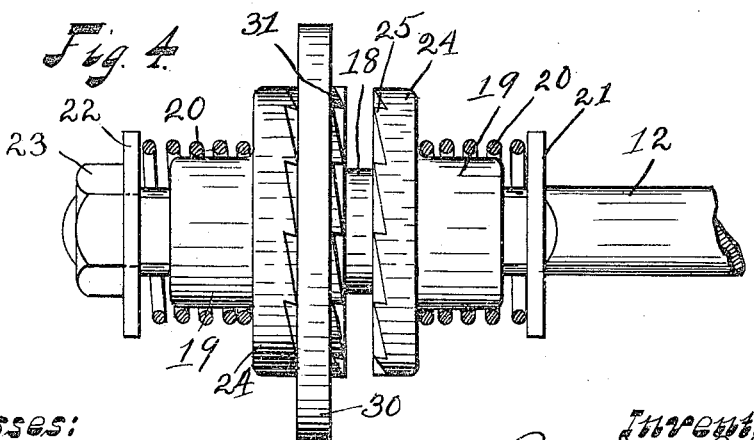

UNITED STATES PATENT OFFICE.

ROYAL H. GILBERT, OF LAKEWOOD, OHIO.

REAR-AXLE CONSTRUCTION.

962,633.

Specification of Letters Patent.  Patented June 28, 1910.

Application filed February 19, 1907. Serial No. 358,229.

*To all whom it may concern:*

Be it known that I, ROYAL H. GILBERT, residing at Lakewood, in the county of Cuyahoga and State of Ohio, have invented a certain new and useful Improvement in Rear-Axle Construction, of which the following is a full, clear, and exact description, reference being had to the accompanying drawings.

This invention relates to the rear axle construction of motor vehicles and the like and has for its object the doing away with the usual differential gear common in such devices and the providing of a suitable device for preventing skidding.

More specifically the invention contemplates the use of a solid rear axle which is preferably arranged to be driven from a centrally located driving shaft and at the same time is adapted to be shifted in one direction or the other, automatically, according to the direction of rotation of the drive. This shifting of the axle couples the wheels of the vehicle to the same irrespective of the direction of rotation in which the axle is driven and these coupling devices between this axle and the driving wheels are such that a clutch member on each wheel is engaged when the axle is shifted in one direction and another clutch member on each wheel is engaged when the axle is shifted in the opposite direction. All of these clutch members are such that, when one wheel is required to move at greater speed than the other, the clutch member on such wheel then in engagement may be free to give and permit such difference in speed.

Still more specifically the invention relates to a rear axle construction wherein a propeller shaft is geared to a suitable driving gear or member having a sleeve portion or hub provided with a spirally arranged recess representing a thread and adapted to receive a thread carried by the axle. This sleeve portion represents a nut.

The axle referred to is capable of moving endwise and at its ends is provided with a pair of clutch members adapted to engage clutch members carried by a web secured in the hub of the wheel. The arrangement is such that, when the propeller shaft is operated to drive the gear or driving member forward, the thread and nut connection shifts the axle endwise and brings about the coupling of one of the clutch members at each end of the shaft with the corresponding clutch members carried by the webs of the wheels.

The invention may be further briefly summarized as consisting in the construction and combination of parts hereinafter set forth in the following description, drawings and claims.

Referring to the drawings Figure 1 is a view of my device in horizontal sections; Fig. 2 is a section upon the line A—A of Fig. 1 looking to the left; Fig. 3 is a section upon the line B—B of Fig. 1 looking to the right; and Fig. 4 is an elevation of the clutch mechanism in connection with each wheel.

In carrying out my invention any preferred form and construction of parts may be employed but I have shown one form in the drawings which meets the requirements very effectively and in such embodiment 1 represents the casing about the rear axle and it is provided with a portion 2 which receives a driving shaft 3 mounted in suitable roller bearings 4 and having keyed to the end thereof a beveled pinion 5 which is adapted to mesh with a bevel gear 6. This bevel gear 6 is provided with a hub 7 which operates as a driving member between the gear and the rear axle as it will appear. The hub 7 is mounted in bearings 8 and 9 and in a manner such that it is held rigidly against any axial movement. This hub or driving member 7 is provided internally with a spirally arranged recess 10 and it serves as a nut, as shown in dotted line in Fig. 1. Slidably mounted within the hub or driving member 7 is a sleeve 11 which is keyed to the axle 12 and is provided with a thread 13 arranged for engagement in the recess or groove 10. This sleeve 11 is held rigidly upon the axle 12 by means of suitable washers 14 and check nuts 15.

From the arrangement of the parts already described it will be seen that when the driving shaft is turned to the right and the gear 6 is operated thereby the sleeve 11 as well as the rear axle will be shifted into the position shown in Fig. 1 when the clutch members, to be described, will be in engagement in a manner to drive the wheels in a forward direction.

The clutch mechanism between the rear wheels and the rear axle will now be described. The clutch or coupling mechanism about each end of the axle 12 is identical in form and construction therefore the description of one end will suffice for both. Each end of the axle 12 is provided with a squared portion 16 extending from the end thereof for a suitable distance and the rounded portions 17 between the faces is threaded as shown for the purpose of receiving a sleeve 18 which is threaded upon the same and forms a stop for the clutch members 19. These clutch members have square openings which receive the square portion 16 of the axle and are free to slide thereon, but are normally held against the sleeve or stop 18 by means of springs 20 which take against them and against fixed stops 21 and 22. The stop 21 is in the form of a washer having a squared opening which receives the squared portion of the axle and it is adapted to be jammed against the axle at the point where it tapers from the squared portion into the round portion. The stop 22 is in the shape of a washer and is held against the end of the axle by means of a bolt or cap screw 23. The clutch members 19 are each provided with a flange portion 24 having upon the face thereof under cut teeth 25 as shown in Fig. 4 for a purpose which will hereinafter be set forth.

The casing 1 is provided with casing tubes 26 extending out and supporting the hubs 27 of the wheels by means of suitable bearings 28 and these hubs have upon their outer ends caps 29, which inclose all of the coupling mechanism. The caps 29 also serve to lock the wheel clutch members 30 to their hubs. The clutch members are annular in form and project inward and fit loosely about the sleeve 18 and between the clutch members 19 coöperating with this sleeve. Each wheel clutch member 30 is provided with clutch teeth 31 similar to the clutch teeth 25, but the teeth on one side of the member are set or arranged reversely to those of the other set.

The clutch members 19 are arranged in pairs at each end of the axle and are faced toward each other, as shown, thus causing their teeth to be reversely arranged and in proper relationship to mesh nicely with the teeth of the corresponding wheel clutch members.

The wheel clutch member is sufficient in thickness so that when it is midway between the two clutch members it is free from engagement with either one of such members thus it follows that it may be in engagement with either one of the clutch members without being in engagement with the other.

The clutch teeth and the clutch members are arranged in a manner such that when the axle is shifted to the right as shown in Fig. 1, the clutch member 19 on the left hand end of the device and the inside clutch member on the right hand end of the device, have their teeth in mesh with the corresponding teeth on the wheel clutch members and when the shaft is operated and the axle is driven the wheels move in a forward direction. Upon the reversing of the drive, however, the axle 12 is shifted to the left bringing about the coupling of the inner clutch member on the left end and the outside clutch member on the right end and these teeth are arranged in a manner such that they will mesh nicely and the wheels will be driven in the reverse direction.

The device is intended for the purpose of serving as a direct drive to the wheels without the use of a differential gear and the difference in rotation of the wheels when making a turn with the device, is taken care of by the clutch member on the high speed wheel giving against the tension of its spring and permitting the axle to drive the low speed wheel without any power being applied to the high speed wheel. This operation takes place whether the machine is driven forward or backward. The device also does away with the wheels spinning when down in a rut for the slow speed wheel is always the one which is driven.

Having described my invention, I claim:

1. In a motor vehicle, in combination, suitable driving wheels, an axle for operating the same, a driving member, suitable coupling devices between said axle and each of the driving wheels whereby the former may be coupled to the latter to drive the same in either direction, each of said wheels being capable of rotating independently at greater speed than the axle when driving in either direction, and means automatically operated and arranged between said driven member and said axle for bringing about the automatic operation of such of the coupling devices as will cause the wheels to be driven by the axle in the proper direction.

2. In a motor vehicle, in combination, a driven member, driving wheels, an axle for operating the driving wheels, suitable coupling devices between said axle and each of the driving wheels whereby the former may be coupled to the latter to drive the same in either direction, both of said wheels being capable of rotating independently at greater speed than the axle when operated in either direction, and means automatically operated by the driven member and arranged between such driven member and the axle for bringing about the automatic operation of such of the coupling devices as will cause the wheels to be driven by the axle in the proper direction.

3. In a motor vehicle, in combination, a driven member, driving wheels, an axle for operating the driving wheels, suitable coupling devices between said axle and each of the driving wheels whereby the former may be coupled to the latter to drive the same in either direction, each of said wheels being capable of rotating at greater speed than the axle when operated in either direction, said coupling operation being brought about by the movement of said axle longitudinally, and means between said driven member and said axle for shifting the latter automatically by the operation of the driven member in either direction, and thereby operating such of the coupling devices as will cause the wheel to be normally driven by the axle in the proper direction.

4. In a motor vehicle, in combination a driven member, an axle, driving wheels, clutch mechanism between said wheels and said axle and arranged in a manner such that when the latter is shifted longitudinally in one direction the wheels will be coupled to the same for driving in one direction and when said axle is shifted in the opposite direction said wheels will be coupled thereto for operation in the reverse direction, and means between said driven member and said axle for shifting the former in the proper direction for driving forward and for shifting it in a reverse direction for driving to the rear.

5. In a motor vehicle, in combination, a driven member, an axle, driving wheels, clutch mechanism between said wheels and said axle and arranged in a manner such that when the latter is shifted longitudinally in one direction the wheels will be coupled to the same for driving in one direction and when said axle is shifted in the opposite direction said wheels are coupled thereto for operation in the reverse direction, and means between said driven member and said axle for automatically shifting the same to bring about the proper coupling of said clutch members according to the direction of rotation.

6. In combination with the driven member of a motor vehicle, of suitable driving wheels, an axle extending from one driving wheel to the other, a forward clutch between said axle and each wheel, a reverse clutch between said axle and each wheel, and means between said driven member and said axle for automatically shifting the same, to cause said clutch members to transmit the drive of the axle to the wheels.

7. The combination with the driven member of a motor vehicle, of suitable driving wheels, an axle extending from one wheel to the other, means operated by said driven member for shifting said axle longitudinally according to the direction of rotation of the driven member, a forward clutch member for each wheel and carried by said axle, a reverse clutch member for each wheel and carried by said axle, and a device carried by each wheel and having clutch members for engagement by and coöperation with the forward and reverse clutch members on the axle.

8. The combination with the driven member of a motor vehicle, of suitable driving wheels, an axle extending from one wheel to the other, means operated by said driven member for shifting said axle longitudinally according to the direction of rotation of the driven member, a forward clutch member for each wheel carried by said axle, a reverse clutch member for each wheel and carried by said axle, a device carried by each wheel and having clutch members for engagement by and coöperation with the forward and reverse clutch members on the axle, and means for permitting either wheel to operate at greater speed than said axle.

9. The combination with the driven member of a motor vehicle, of suitable driving wheels, an axle extending from one wheel to the other, means operated by said driven member for shifting said axle longitudinally according to the direction of rotation of the driven member, a forward clutch member for each wheel and carried by said axle, a reverse clutch member for each wheel and carried by said axle, a device carried by each wheel and having a clutch member for engagement by and coöperation with the forward and reverse clutch members on the axle and means for permitting either wheel to operate at greater speed than said axle and irrespective of the direction of rotation.

10. The combination with the driven member of a motor vehicle, of suitable driving wheels, an axle extending from one wheel to the other, means operated by said driven member for shifting said axle longitudinally according to the direction of rotation of the driven member, a yielding forward clutch member for each wheel and carried by said axle, a yielding reverse clutch member for each wheel and carried by said axle, and a device carried by each wheel and having members for engagement by and coöperation with the forward and reverse clutch members on said axle.

11. The combination with the driven member of a motor vehicle, of suitable driving wheels, an axle extending from one wheel to the other, means operated by said driven member for shifting said axle longitudinally according to the direction of rotation of the driven member, a yielding forward clutch member for each wheel and carried by said axle, a yielding reverse clutch member for each wheel and carried by said axle, and a device carried by each wheel and having members for engagement by and coöperation with the forward and reverse clutch members on said axle.

12. The combination with the driven member of a motor vehicle, of suitable driving wheels, an axle extending from one wheel to the other, means operated by said driven member for shifting said axle longitudinally according to the direction of rotation of the driven member, a forward clutch member for each wheel and movable endwise only on said axle, a reverse clutch member for each wheel and movable endwise only on said axle, a stop for each wheel carried by said axle and adapted to be engaged by said clutch members, means for holding said clutch members yieldingly against said stop, and clutch members carried by each wheel for engagement by and coöperation with the forward and reverse clutch members of such wheel.

13. The combination with the driven member of a motor vehicle, of suitable driving wheels, an axle extending from one wheel to the other and provided with squared ends, means operated by said driven member for shifting said axle longitudinally according to the direction of rotation of such member, a forward clutch member for each wheel and slidably mounted upon the corresponding squared portion of the axle, a reverse clutch member for each wheel and slidably mounted upon the corresponding squared portion of the axle, means for limiting the sliding movement of said clutch members in one direction, means tending to move said members in the same direction, and suitable clutch members for each wheel and adapted for engagement by and coöperation with the forward and reverse clutch members on the axle.

14. The combination with the driven member of a motor vehicle, of suitable driving wheels, an axle extending from one wheel to the other and provided with squared ends, means operated by said driven member for shifting said axle longitudinally according to the direction of rotation of such member, a forward clutch member for each wheel and slidably mounted upon the corresponding squared portion of the axle, a reverse clutch member for each wheel and slidably mounted upon the corresponding squared portion of the axle, a stop carried by said axle, means for holding said clutch members against said stops whereby when said axle is shifted longitudinally said clutch members will be shifted with it also, and a device provided with forward and reverse clutch members for each wheel and adapted for engagement by the clutch members on the axle when shifted.

15. The combination with the driven member for a motor vehicle, of suitable driving wheels, an axle extending from one wheel to the other and provided with squared end portions, means operated by said driven member for shifting said axle longitudinally according to the direction of rotation of the driven member, a forward clutch member for each wheel and slidably mounted upon the corresponding squared portion of the axle, a reverse clutch member slidably mounted upon said axle and facing the same, a stop secured to said shaft, means for holding said clutch members yieldingly against said stop and a member carried by each hub and projecting between the faces of the corresponding forward and reverse clutch members on the axle and having clutch portions carried by said member and adapted to be engaged by one or the other of the clutch members on the axle when the same is shifted.

16. The combination with the driven member of a motor vehicle, of suitable driving wheels, an axle extending from one wheel to the other, suitable coupling devices between said axle and each of the driving wheels whereby the former may be connected to drive the latter either forward or reverse, said axle being capable of endwise movement for bringing about such coupling, and means operated by the rotation of the driven member for automatically bringing about such coupling.

17. The combination with the driven member of a motor vehicle, of suitable driving wheels, an axle extending from one wheel to the other, suitable coupling devices between said axle and each of the driving wheels whereby the former may be connected to drive the latter either forward or reverse, said axle being capable of endwise movement for bringing about such coupling, and a camming device between said driven member and said axle for shifting the latter.

18. The combination with the driven member of a motor vehicle, of suitable driving wheels, an axle extending from one wheel to the other, suitable coupling devices between said axle and each of the driving wheels whereby the former may be connected to drive the latter either forward or reverse, said axle being capable of endwise movement for bringing about such coupling, and a thread and nut connection between said driven member and said axle for bringing about the shifting of the latter.

19. The combination with the driven member of a motor vehicle, of suitable driving wheels, an axle extending from one wheel to the other, suitable coupling devices between said axle and each of the driving wheels whereby the former may be connected to drive the latter either forward or reverse, said axle being capable of endwise movement for bringing about such coupling, a thread carried by said axle, and a nut member carried by said driven member and adapted to cause the shifting of said axle.

20. The combination with a motor vehicle, of a driven member held against all except rotary movement, suitable driving wheels, an axle extending from one driving wheel to the other, suitable coupling devices between said axle and each of the driving wheels, whereby the former may be connected to drive the latter either forward or reverse, said axle being capable of endwise movement for bringing about such coupling, a nut member carried by said driven member, having a spirally arranged recess therein, and a sleeve rigidly secured to the axle and provided with a thread adapted to take in the recess in said nut member.

21. In a motor vehicle, an axle, driving wheels upon said axle, forward and reverse clutch members carried by each of the wheels and the axle, and means for shifting the shaft longitudinally to bring into engagement the proper clutch members when the direction of rotation is changed.

In testimony whereof I affix my signature in the presence of two witnesses.

ROYAL H. GILBERT.

Witnesses:
FRED H. COOK,
B. W. BROCKETT.